United States Patent [19]

Sagawa et al.

[11] 3,872,245

[45] Mar. 18, 1975

[54] PHOTOSENSOR ACTUATING DEVICE

[75] Inventors: Akio Sagawa; Hideaki Kawakami, both of Hitachi, Japan

[73] Assignee: Hitachi, Ltd., Tokyo, Japan

[22] Filed: Jan. 30, 1973

[21] Appl. No.: 328,094

[30] Foreign Application Priority Data

Jan. 31, 1972 Japan .............................. 47-10576
Mar. 8, 1972 Japan .............................. 47-23184

[52] U.S. Cl. .............................. 178/7.1, 250/220 M
[51] Int. Cl. .............................. H04n 5/30
[58] Field of Search...... 178/7.3 D, 7.1; 250/220 M, 250/211 R, 211 J

[56] References Cited

UNITED STATES PATENTS

| | | | |
|---|---|---|---|
| 2,804,497 | 8/1957 | Eliot | 178/7.1 |
| 3,390,273 | 6/1968 | Weckler | 250/211 J |
| 3,543,248 | 11/1970 | Oliver | 340/166 EL |
| 3,689,912 | 9/1972 | Dick | 340/166 EL |
| 3,715,485 | 2/1973 | Weimer | 178/7.1 |
| 3,733,435 | 5/1973 | Chodil et al. | 178/7.3 D |

*Primary Examiner*—Robert L. Griffin
*Assistant Examiner*—Mitchell Saffian
*Attorney, Agent, or Firm*—Craig & Antonelli

[57] ABSTRACT

Pulses for erasing the electric charges stored in a plurality of photo-sensitive elements disposed in an array and with their output lines connected in common are applied to the input lines thereof. After the lapse of a predetermined time period for storage of electric charges, sampling pulses are applied in sequence to the input lines of the photo-sensitive elements, whereby it is possible to obtain sequential optical information on the stored electric charges from the plurality of photo-sensitive elements.

3 Claims, 13 Drawing Figures

PHOTOSENSOR ACTUATING DEVICE

The present invention relates to an image reading device or optical scanning device for use with a facsimile device or the like.

A high speed facsimile in which a laser beam and light polarizer are used in its optical scanning device, as well as an optical character recognition system in which a similar light polarizer is employed in its photoelectric converter device, has been developed as a system replacing the conventional flying spot scanner.

On the other hand, the application of a solid-state image pick-up device with a semiconductor to a high speed optical scanning device has been studied. In such a device, the photo-electric conversion of characters and images is performed by the image pick-up operation of a one-dimensional array of photosensors.

The one-dimensional or two-dimensional array of photosensor elements are being closely examined as an effective means for solidifying the photo-electric conversion section of the optical character recognition device. In any case, the operation of the electric charge storage type is superior to that of the DC type as an image pick-up means for the photosensor array.

The main advantages of the electric charge storage type of operation are as follows:

1. Carriers produced during the storage time by an optical signal are stored.
2. The period of after-image is shortened.
3. It is possible to employ integrated circuits as the peripheral circuits for increased speed.

The main photo-electric conversion elements used in a photosensor array for reading characters and images include photo-transistors and photo-diodes, and the operation of the electric charge storage type is well known as a means for energizing the photoelectric conversion elements for scanning.

In one of the well known systems, sampling pulses are applied in sequence to a plurality of photo-transistors making up a photosensor array, which sampling pulses act to release the electric charges stored in the junction capacitance of each photo-transistor which has received the sampling pulses, while at the same time reading information as required.

In other words, the prior art system is such that the preceding or out-of-date electric charges are released by sampling uulses and the subsequent DC level is utilized to read optical information. In such a conventional system, if the intervals between the sampling pulses and therefore the time period available for releasing the electric charges are made short to obtain a high speed of photo-electric conversion, the capacitance in each photo-transistor may not be fully discharged, resulting in erroneous detection in the following sampling operation. This in turn causes obscure or out-of-position images and characters for facsimile equipment on one hand and the difficulty in reading each picture element for an optical character recognition device on the other, resulting in a reading error.

Further, the prior art system is characterized by a low sensitivity because optical information is read by DC current of a low level.

An object of the present invention is to provide a unique photosensor driving or actuating system which has a very high scanning speed and is capable of reading information with a high sensitivity.

Another object of the invention is to provide a photosensor driving system with a simple construction.

The system according to the present invention is characterized in that pulses for releasing electric charges are collectively applied to a plurality of photosensitive elements disposed in an array and after a predetermined time period for storing the charges, sampling pulses are applied to the photo-sensitive elements in sequence.

The present invention is further characterized in that an initial peak voltage first appearing from each photosensitive element due to the sampling pulse applied thereto after the lapse of the charging or storage period is used to detect optical information.

Furthermore, according to the present invention, the output potential of each photo-sensitive element is forcibly reduced to zero during the release of electric charges thereof thereby to shorten the period required for the discharging operation.

The above and other objects, features and advantages will be made apparent by the detailed description taken in conjunction with the accompanying drawings, in which:

FIGS. 1*a*, 1*b* and 1*c* are diagrams for explaining the principle of the operation of the electric charges storing type acccording to the present invention;

FIGS. 2*a*, 2*b*, 2*c*, 3*a* and 3*b* are diagrams for explaining the photosensor driving system of the conventional type;

Figure 1A:
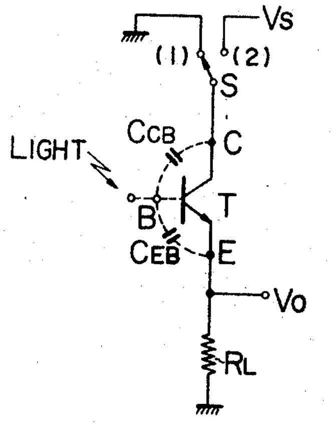
FIG. 1a PRIOR ART
Figure 1B:
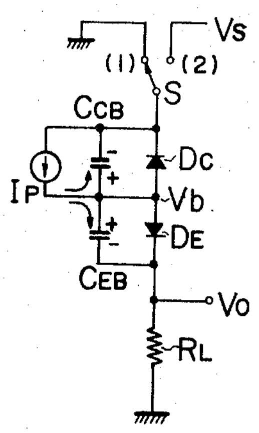
FIG. 1b PRIOR ART
Figure 1C:
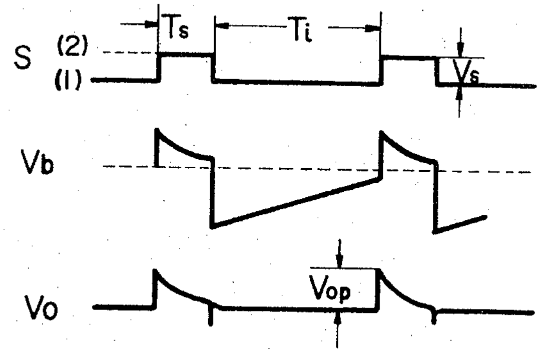
FIG. 1c PRIOR ART

Of FIGS. 1*a*, 1*b* and 1*c* showing the principle of operation of the charge storing type, FIG. 1*a* shows a photo-transistor circuit, FIG. 1*b* an equivalent circuit and FIG. 1*c* waveforms produced from the various parts of the circuit. While a photosensor array may take the form of a photo-transistor array, a photo-diode array or a photo-conductive element array, this particular explanation is given by example of a photo-transistor array. If it is assumed that the junction capacitances between the collector C of the photo-transistor T and the base B thereof and between the emitter E and the base B thereof are $C_{CB}$ and $C_{EB}$ respectively, an equivalent circuit of the circuit of FIG. 1 may be shown as in FIG. 1*b*. In FIG. 1*b*, the diodes $D_C$ and $D_E$ are equivalent to the collector base and emitter-base junction diodes respectively, and electric current generated by the current source I*p* is a substitute for the photoelectric current produced by the light entering the photo-transistors. When the voltage Vs is not applied to the collector of the photo-transistors, that is to say, when the switch S is closed to the side (1), light which enters the circuit produces the photoelectric current I*p*, which in turn causes electric charges as shown in the figure to be stored in the capacitors $C_{CB}$ and $C_{EB}$.

When the collector voltage V*s* is applied by closing the switch S to the side (2), the electric charges stored in the capacitor $C_{CB}$ flows to the load resistor $R_L$ through the junction diode $D_E$ between the base and emitter.

Under this condition, the detection of peak voltage value V*op* appearing across the terminals of the load resistor $R_L$ enables a desired photo-electric conversion.

In this case, the following equation is obtained:

$$V_{OP} \doteqdot \frac{Ip \cdot Ti}{C_{CB}} - 2\frac{C_{EB}}{C_{CB}} \cdot V_{beo} \quad (1)$$

where $V_{OP}$ is the peak voltage value, T*i* the time during which electric charges are stored, and $V_{beo}$ is the base-emitter voltage under the unsaturated state of the transistor, the equation (1) applying to the case where the transistor is not saturated by the photoelectric current within the time T*i*.

Thus an output for photo-electric conversion is obtained which is the product of the photoelectric current I*p* associated with the amount of light and the time T*i* during which the photoelectric charges are stored. Under this condition, the output waveforms as shown in FIG. 1*c* are produced from the component elements of the circuit of FIG. 1*b*.

Figure 2A:
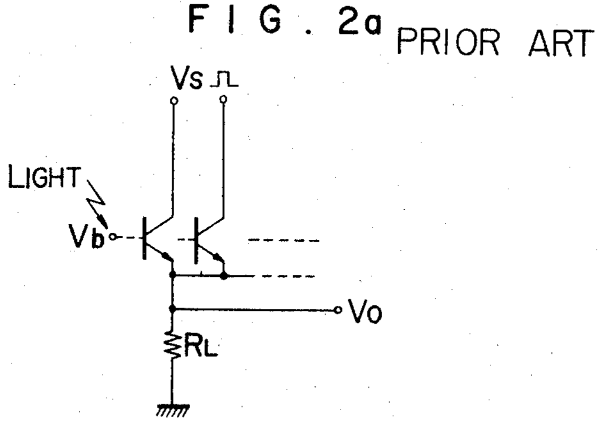
FIG. 2a PRIOR ART
Figure 2B:
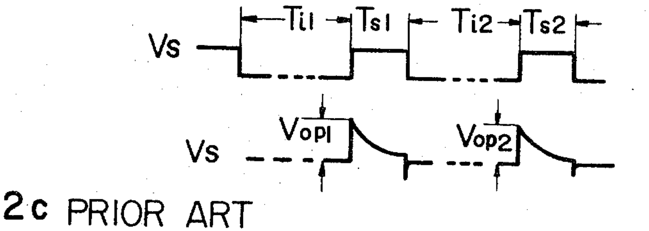
FIG. 2b PRIOR ART
Figure 2C:
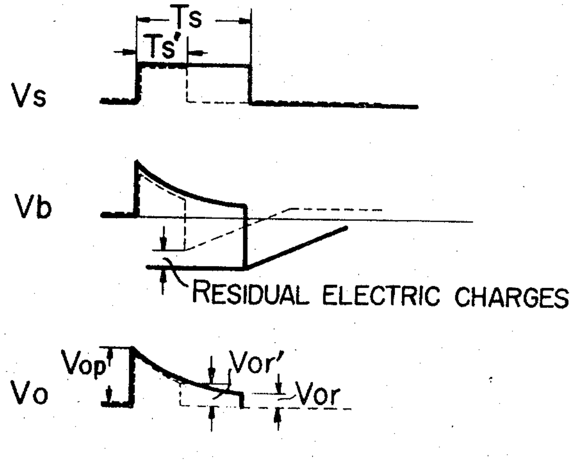
FIG. 2c PRIOR ART

FIGS. 2*a*, 2*b* and 2*c* show an example of the sampling operation of the conventional photo-transistor array, in which FIG. 2*a* illustrates part of the photo-transistor array, to the collector terminal of which the sampling signal V*s* as shown in FIG. 2*b* is applied.

In other words, electricity is charged by the photoelectric current I*p* which flows during the charging time T*i*, and the pulse $V_O$ with its peak value equivalent to I*p*·T*i* is detected by the sampling pulse V*s*, while at the same time erasing the preceding stored charges.

If the sampling time T*s* is shortened to T*s'* as shown in FIG. 2*c*, the electric charges stored in the junction capacitor $C_{CB}$ are not completely erased and as a result the remaining charges are added to the electric charges subsequently stored. Therefore, it is desirable that the sampling time T*s* is such that the final value V*or* is sufficiently low compared with the peak value V*op* of the output signal V*o*.

Figure 3A:
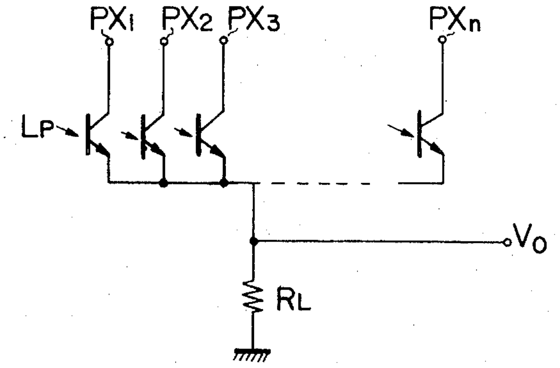
FIG. 3a PRIOR ART
Figure 3B:
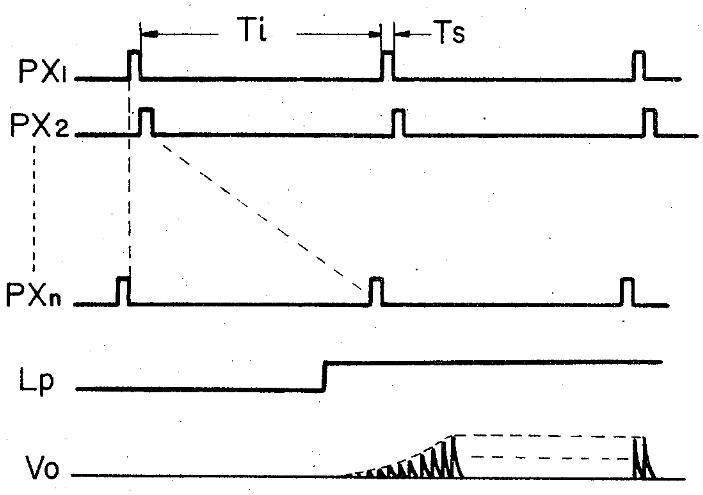
FIG. 3b PRIOR ART

In scanning in the manner as shown in FIG. 3*a* the photo-transistors in the number of n shown in FIG. 3*b*, the electric charges storing time T*i* is expressed as $$Ti = n \cdot Ts \quad (2)$$

where Ts is the sampling time.

For this reason, in the case of sudden disappearance of the light L*p* entering the photosensor array, the photo-electric converted output signal shows a delayed response as shown in FIG. 3*b*.

In like manner, when the light entering the photosensor array is turned off suddenly, the electric charges stored prior to the detecting operation cause the output signal to show a delayed response. If the photo-electric converted output signal thus influenced by the preceding stored charges is used for the detection of a facsimile image, distortion or ambiguity of the image is caused. Also, it results in a reading error for such a photo-electric conversion device as the optical character reader.

An embodiment of the invention will be now explained below.

Figure 4:
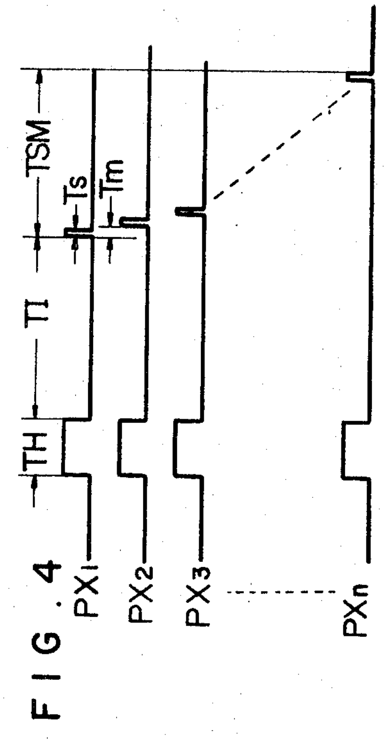
FIG. 4 is a diagram showing an example of the scanning signal waveforms according to the present invention.

In FIG. 4 which shows an example of the wave-forms of the scanning signal according to the present invention, the symbol TH shows the time for erasing the residual electric charges, TI the time for storing the predetermined amount of light and Tsm the sampling cycle for photo-electric conversion. It will be seen that pulses are provided for erasing the already stored electric charges immediately before the sampling operation.

This eliminates the need to erase the stored electric charges by means of the sampling pulses, making it possible to reduce the pulse width of the sampling pulse to less than 100 *ns* without any adverse effect on the photo-electric converting operation.

Figure 5:
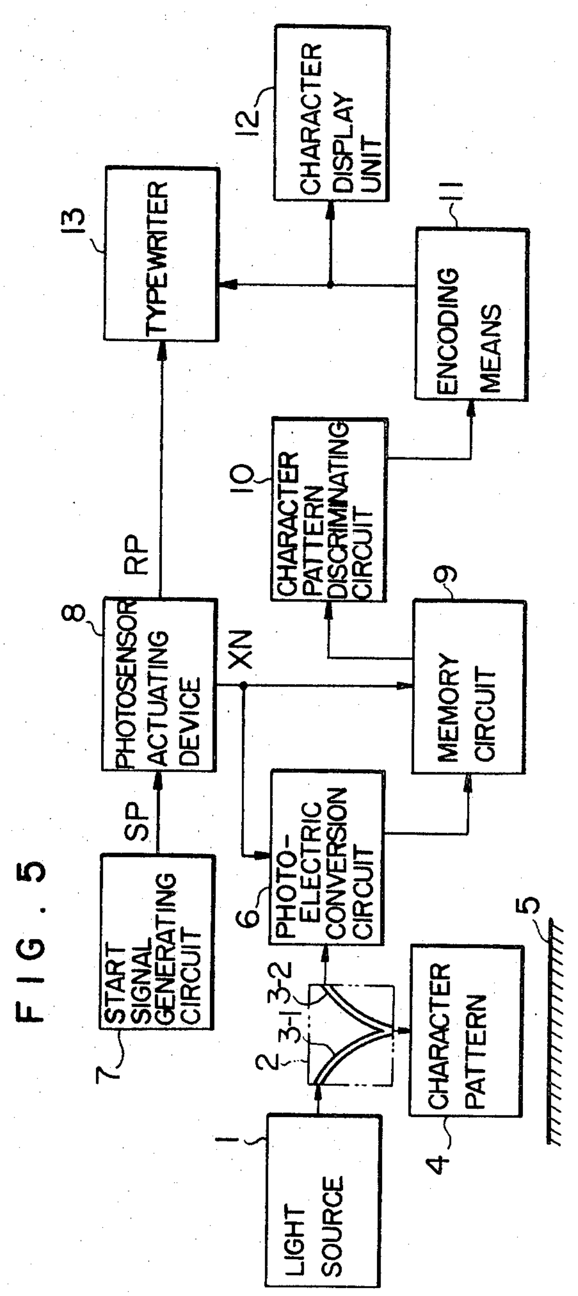
FIG. 5 is a block diagram showing an example of the applications of the present invention.

In FIG. 5 is shown a block diagram of the optical character reader to which the photosensor driving system according to the present invention is applied. In this figure, the reference numeral 1 shows a light source, the numeral 2 an optical guide comprising an optical fiber 3-1 for the entrance path and an optical fiber 3-2 for the path of reflected light, the numeral 4 means for detecting the character pattern, the numeral 5 a face of the paper carrying the characters to be read, the numeral 6 a photo-electric conversion section with photosensors, the numeral 7 a means for generating a signal for starting to read characters, the numeral 8 the photosensor driving system according to the invention, and the numeral 9 a circuit for memorizing signals representing character patterns. The reference numeral 10 shows a character pattern discriminator circuit, the numeral 11 an encoding section, the numeral 12 a circuit for displaying characters read, and the numeral 13 a typewriter for printing the read characters.

Now the operation of the system according to the present invention will be briefly explained. The character pattern detecting means 4 radiates light from the light source 1 on the paper face through the optical fiber 3-1 of the optical guide 2, whereupon the light reflected on the paper face is sent through the optical fiber 3-2 to the photo-electric conversion section 6 comprising photosensors disposed in an array and in the number of, say, 11 multiplied by 9. The image of the character thus sent from the surface of the paper is divided into picture elements in the number of 11 multiplied by 9, so that each photosensor 6 arranged in a matrix performs the photo-electric conversion for each picture element.

A character pattern is detected and memorized or stored in such a manner that the photosensors are scanned by the scanner signal XN from the photosensor driving device 8, whereupon the resulting photo-electric converted signals are stored in the memory circuit 9. The stored character pattern is identified by the character pattern discriminating circuit 10 and converted into ASCII (American Standard Code for Information Interchange) by the encoding means 11 and then displayed on the character display unit 12 or printed with the typewriter 13. The character-read-start signal generator circuit 7 is so constructed as to generate a signal when the character pattern detecting means 4 is placed above the portion of the paper carrying the characters to be read. When the photosensor driving device 8 has completed the scanning of the photosensors 6, a typewriting signal RP is produced.

Figure 6:
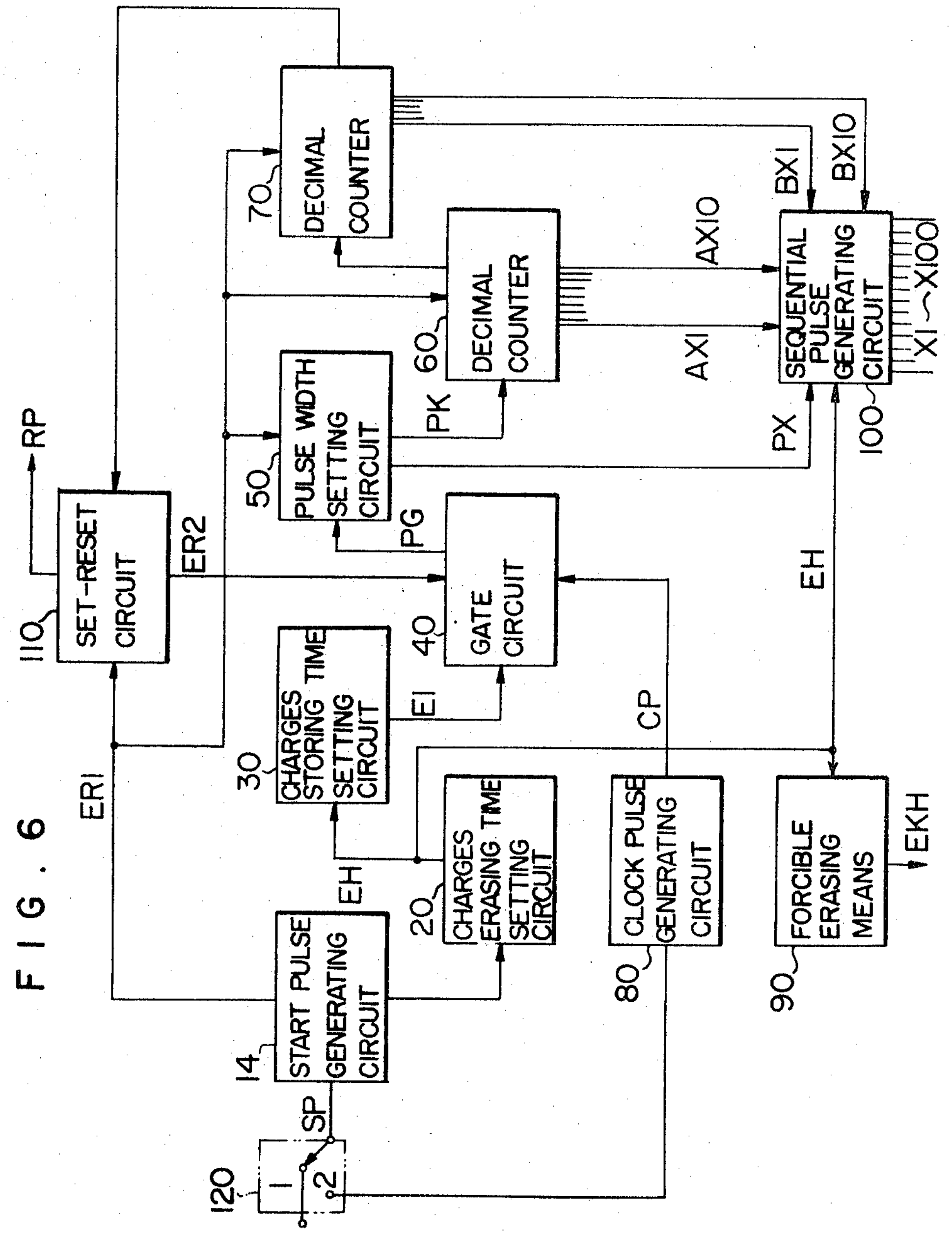
FIG. 6 is a block diagram showing an embodiment of the present invention.

A block diagram of an embodiment of the photosensor driving device according to the present invention which is equivalent to the photosensor driving device 8 in FIG. 5 is shown in FIG. 6. In this figure, the reference numeral 14 shows a start pulse generating circuit, the numeral 20 a charges erasing time setting circuit, the numeral 30 a charges storing time setting circuit, the numeral 40 a gate circuit, the numeral 50 a sampling pulse width and interval setting circuit, the numerals 60 and 70 decimal counter circuits, the numeral 80 a clock pulse generating circuit, the numeral 90 a forcible erasing pulse generating circuit, the numeral 100 a sequential pulse generating circuit, the numeral 110 a set-reset circuit, and the numeral 120 an internal-external change-over circuit.

Figure 7:
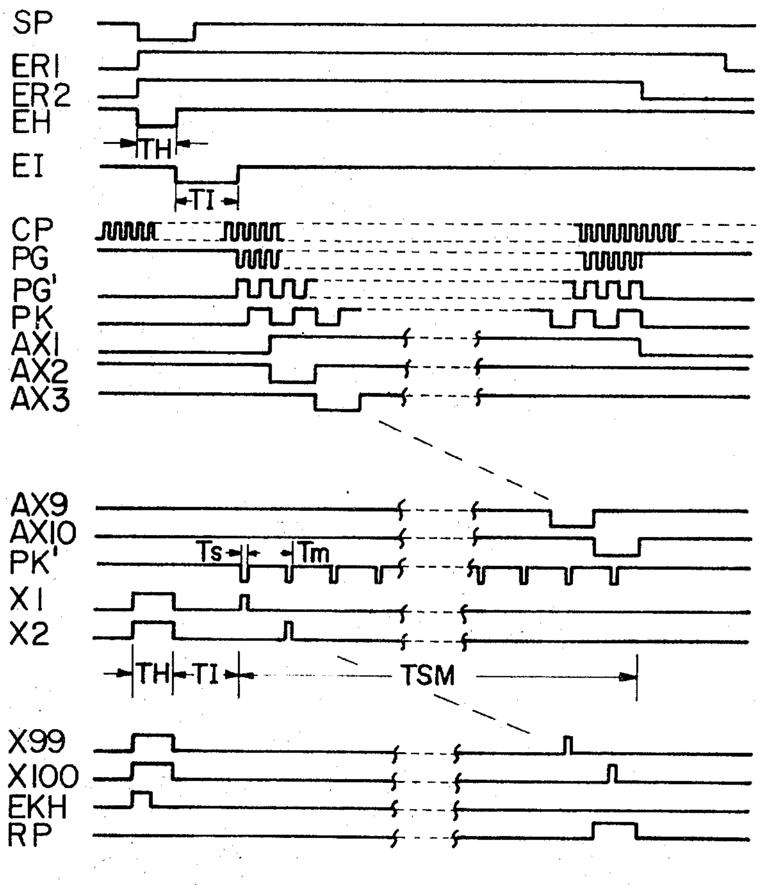
FIG. 7 is a diagram showing time sequences relating to the operation of the circuit shown in FIG. 6.

Reference will be made to the operation of the above-described embodiment. Either the external clock pulse 1 or internal clock pulse 2 is selected and applied to the start pulse generating circuit 14 for generating a pulse for starting the scanning operation. The charges-erasing time TH and the charges-storing time TI in the sequence shown in FIG. 7 are set respectively by the charges erasing time setting circuit 20 and the charges storing time setting circuit 30. The gate circuit 40 is closed thereby to pass the clock signal from the clock pulse generating circuit 80 to the sampling signal width and interval setting circuit 50, whereby the width of the sampling pulse T*s* and the interval thereof T*m* are set and counted by the decimal counters 60 and 70 respectively. The sequential pulse generating circuit 100 produces 100 different combinations X1 to X100 of output signals AX1 to AX10 and BX1 to BX10 of the decimal counters 60 and 70. In this case, 100 different combinations of the charges erasing time TH, the charges storing time TI, the sampling pulse width T*s* and the pulse interval T*m* are included in the sequential pulses X1 to X100 as shown in FIG. 7. Upon completion of the generation of the sequential pulses, a reset signal is automatically produced from the set-reset circuit 110 thereby to stop the operation until the generation of the next start pulse signal SP. On the other hand, the forcible erasing pulse generating circuit 90 is provided for the purpose of shortening the erasing time in case there are many photosensors included. The charges erasing time TH depends on the load resistance $R_L$ and the electrostatic capacity of the junction capacitor $C_{CB}$ multiplied by the current amplification factor $\alpha$ and is required to be longer the more the elements included in the photosensor array. For example, although the time required for scanning one phototransistor is reduced to about several tens nanoseconds, a charge erasing time TH of several hundred microseconds is required in the case where 40 elements are employed with the load resistance of kΩ. As a result, the greater part of the scanning time (TH + TI + TSM) is occupied by the charges erasing time TH.

In theory, it is possible to shorten the charges erasing time TH by lowering the load resistance $R_L$, but this results in a smaller amplitude of the output signal V*o* for inferior sensitivity.

This problem is overcome by the insertion of the forcible erasing pulse generating circuit 90 whereby the charges erasing time can be shortened to about 1 microsecond. As will be described later, the forcible erasing pulse generating circuit 90 is so constructed that the output lines of the photosensitive elements are reduced forcibly to zero in potential.

Figure 8:
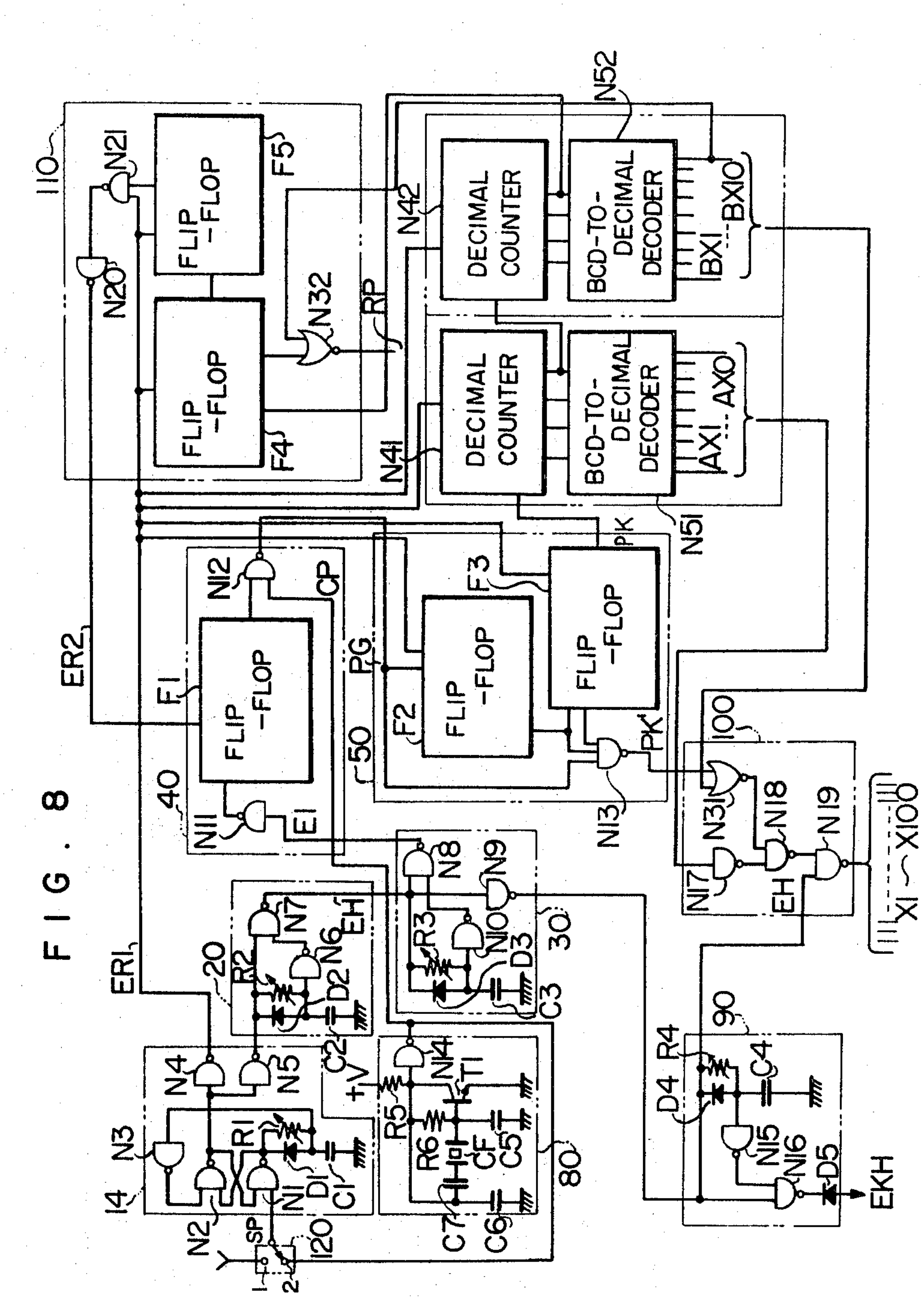
FIG. 8 is a diagram showing connections within the blocks shown in FIG. 6.

An example of the embodiment of FIG. 6 is illustrated in FIG. 8. In this figure, like reference numerals show like component elements as in FIG. 8. The reference numerals N1 to N21 show NAND gate logical circuits, N31 to N32 NOR gate logical circuits, N41 to N42 decimal counters, N51 to N52 BCD-to-Decimal decoders, F1 to F5 flip-flops, R1 to R6 resistors, C1 to C7 capacitors, D1 to D5 diodes, T1 a transistor, and CF an oscillating element. The start pulse generating circuit 14 includes an S-R flip-flop made up of the NAND gates N1 and N2, while the diode $D_1$, capacitor $C_1$ and resistor $R_1$ constitute a one-shot multivibrator. This one-shot multivibrator functions in such a manner that duplication of the operation is prevented when the second pulse is applied prior to the completion of generation of the sequential pulses X1 to X100.

The charges erasing time setting circuit 20, the charges storing time setting circuit 30 and the forcible erasing pulse generation circuit 90 respectively include a one-shot multivibrator circuit comprising a NAND gate, a resistor, a capacitor and a diode, the operating time of each circuit depending on the time constant determined by the resistor R and capacitor C. The gate circuit 40 for clock pulses CP includes a flip-flop and NAND gates and is controlled by the outputs from the charge storing time setting circuit 30 and from the set-reset circuit 110. The sampling pulse width setting circuit 50 which includes for example two flip-flops and a NAND gate, divides the frequency of the clock pulses or reduces the number of the pulses per unit time and provides the pulse width T*s* and the unit interval T*m*. The output EKH of the forcible erasing pulse generation circuit 90 which is actuated by output EH of the charge storing time setting circuit 30, is connected to a circuit (not shown) as an actuating input which acts to ground the output terminals of the photosensitive elements or to short-circuit the load resistors connected to the outputs of the photosensitive elements to thereby eliminate the residual charges in a short time.

The set-reset circuit 110 produces a reset signal through a flip-flop by means of a final signal of the decimal counter output, in such a manner that a set signal is not produced until the next start signal is applied thereto. As shown in FIG. 5, in the case the invention is applied to the character reader, the scanning completion signal RP is used also as a typewriting signal.

The sequential pulse generating circuit 100 includes a NOR circuit having as inputs the outputs BX1 to BX10 of the decimal counter 70 and the output PK of the sampling pulse width and interval setting circuit 50, while the output of the NOR circuit and the outputs AX1 to AX10 of the decimal counter 60 make up the inputs of a NAND circuit. Further, the output of the NAND circuit and the charges erasing signal EH constitute inputs to another NAND circuit, thereby to produce the 100 sequential pulses X1 to X100 as shown in FIG. 8.

The clock pulse generating circuit 80 comprises an oscillator element CF and the transistor T1.

By the use of the above-described circuit arrangement, it is possible to produce a set of sequential pulses with predetermined charges erasing time, charges storing time and sampling time in order to energize the photosensors for photo-electric conversion.

It will be understood from the above explanation that according to the present invention pulses for erasing charges are collectively applied to a plurality of photosensor elements arranged in an array, followed by the application thereto of sampling pulses in sequence after a predetermined charges storing time, resulting in a very high scanning speed in comparison with the prior art method in which the sampling pulses act both to erase the charges and to read required information.

The results of our experiments shows that according to the invention the width of the sampling pulse is reduced to several tens of nanosecond or even to several hundreds of nanosecond as against several tens to several hundreds of microsecond which is required if accurate photo-electric conversion is to be achieved in the conventional method.

The advantage of the small width of the sampling pulse is especially conspicuous in the case where the photosensor array involves a great number of photosensitive elements.

Furthermore, in the photosensor driving system according to the present invention the initial peak voltage value is read after the application of a sampling pulse, so that an output of several volts is obtained as the initial peak voltage value, resulting in an ability to read information with very high sensitivity.

What we claim is:

1. A photosensor driving system used for sequentially driving a plurality of photosensitive elements disposed in an array with output lines thereof forming a common output line connected to a common load resistor, the system comprising a plurality of pulse output lines each operationally coupled to each of said photosensitive elements, and pulse means for initially providing all of said pulse output lines with a pulse signal having a duration only sufficient to erase electric charges stored in said photosensitive elements and for providing after a predetermined period for storage of electric charges each of said photosensitive elements in a sequential order with a pulse signal having a duration only sufficient to read out optical information stored in respective ones of said photosensitive elements.

2. A photosensor driving system according to claim 1, wherein there is further included means which are operationally coupled to the common output line of said photosensitive elements for producing a short pulse to bring the potential of said output line to zero in synchronization with the start of said pulse for erasing electric charge.

3. A photosensor driving system according to claim 1, wherein said pulse means comprises a clock pulse generating circuit, a start pulse generating circuit having an input selectively connectable with said clock pulse generating circuit, an electric charge erasing time setting circuit connected to an output of said start pulse generating circuit and providing an output, an electric charge storing time setting circuit having an input connected to the output of said electric charge erasing time setting circuit and providing an output, a gate circuit having inputs connected to said clock pulse generating circuit and said electric charge storing time setting circuit and providing an output, a pulse width setting circuit having inputs connected to said gate circuit and said start pulse generating circuit, counter means having inputs connected to the pulse width setting circuit and said start pulse generating circuit, a sequential pulse generating circuit having inputs connected to said counter means, said pulse width setting circuit and said electric charge erasing time setting circuit and providing an output, and a set-reset circuit having inputs connected to set start pulse generating circuit and set counter means and an output connected to an input of said gate circuit.

* * * * *